United States Patent [19]

Mixon

[11] 4,351,722

[45] Sep. 28, 1982

[54] WATER TREATMENT PLANT

[75] Inventor: James A. Mixon, Jacksonville, Fla.

[73] Assignee: American Enviro-Port, Inc., Jacksonville, Fla.

[21] Appl. No.: 882,437

[22] Filed: Mar. 1, 1978

[51] Int. Cl.³ .............................................. C02F 3/22
[52] U.S. Cl. ................................ 210/195.3; 210/197; 210/202; 210/220; 210/260
[58] Field of Search ............. 210/170, 195 S, 195 SO, 210/197, 199, 202, 220, 221 R, 260

[56] References Cited

U.S. PATENT DOCUMENTS

| | | | |
|---|---|---|---|
| 2,901,114 | 8/1959 | Smith et al. | 210/202 X |
| 3,348,687 | 10/1967 | Foster | 210/195 S |
| 3,398,838 | 8/1968 | Mitchell | 210/195 S X |
| 3,415,381 | 12/1968 | Thayer | 210/202 |
| 3,438,499 | 4/1969 | Reckers | 210/195 S X |
| 3,684,703 | 8/1972 | Marmo | 210/202 X |
| 3,764,011 | 10/1973 | Owens | 210/260 X |
| 3,907,672 | 9/1975 | Milne | 210/195 S X |
| 4,021,347 | 5/1977 | Teller et al. | 210/195 S |

FOREIGN PATENT DOCUMENTS 39640 9/1973 Australia ........................ 210/195 S

OTHER PUBLICATIONS

Tex-A-Robic, Contact Stabilization Waste Treatment Plant with Mechanical Clarifier, Bulletin RCCS-72, Can Tex Ind. Factory Package Aerobic Sewage Treatment Plant, Davco Man. Co.

Primary Examiner—Robert H. Spitzer
Attorney, Agent, or Firm—Arthur G. Yeager

[57] ABSTRACT

A water treatment plant comprising a generally horizontal cylindrical tank and an upstanding cylindrical tank usually having a diameter less than the horizontal tank and being integrally attached to and intersecting an end wall portion thereof. The horizontal tank includes a transverse partition and a longitudinal partition which extends from an intermediate portion of the transverse partition to the upstanding tank and divides the first tank into an aeration chamber, a sludge holding chamber and a purifying or chlorine contact chamber. The second tank comprises a clarifying chamber including an upper portion having influent and effluent pipe means and skimming means and a bottom portion having a circular bottom surface, an outlet and scraper means for moving sediment into the outlet for recirculation either to the aeration chamber or to the sludge holding chamber.

12 Claims, 4 Drawing Figures

WATER TREATMENT PLANT

BACKGROUND OF THE INVENTION

This invention relates to waste water treatment plants and is concerned with the provision of a practical waste water treatment plant which incorporates a blend of structural integrity, mechanical reliability and environmental compatibility. The terms waste water or sewage, as used hereinafter in the specification and claims, is intended to also include nonpolluting sediments and organic-inorganic pollutants such as industrial wastes.

Present sewage treatment plants employ aspects of aerobic and/or anaerobic processes. The term aerobic designates the presence of dissolved oxygen in the treatment process and the term anaerobic designates the absence or deficiency of dissolved oxygen in the treatment process. More particularly, this invention relates to a sewage treatment plant which generally employs an activated sludge process. The activated sludge process commonly includes a primary treatment and a secondary biological treatment of the sewage.

Before undergoing secondary biological treatment, waste water or sewage is commonly subjected to a primary treatment to reduce and remove insoluble and oversize materials. Devices which can be employed in the primary treatment include, either singly or in combination, coarse screens or racks, grit chambers, primary settling tanks, mechanical material reducers and other similar equipment. The purpose of screens and racks is to remove larger particles of floating or suspended material from the waste water. Similarly, grit chambers resemble modified settling basins in which the horizontal flow velocity of the waste water is controlled so that heavier solids, such as sand and metal, are removed while lighter material remains in suspension. Primary settling tanks are used in some activated sludge plants for removing material which settles rapidly from waste water.

The general purpose of the secondary biological treatment is to remove organic material and to clarify and purify the effluent. Generally, the organic material is removed by the aerobic processes of oxidation of organic material to carbon dioxide, water and other derivatives, which is known as respiration, and conversion of the organic material into new material, which is known as synthesis. The activated sludge process may be described as combining organic material, such as sewage, with activated sludge, which contains aerobic bacteria, and oxygen to yield carbon dioxide, water, energy and other products, wherein the energy released during this process allows the synthesis of the new material. The amount of oxygen necessary to oxidize the organic material is primarily dependent upon the biological oxygen demand (BOD) that is required during this process.

Conventional activated sludge plants commonly employ an aeration chamber, a clarifier and an excess sludge holding tank. Organic material such as raw sewage is mixed with activated sludge, which contains the aerobic bacteria, and the mixture is aerated in the aeration chamber until the organic material is suitably biodegraded which usually occurs within six to eight hours. After aeration, the mixture of organic material and activated sludge, referred to as mixed liquor, is transferred to a clarifier or settling tank where the solids settle out of the solution in the form of a sludge, which contains aerobic bacteria, and the remaining solution, referred to as effluent, may be further treated in separate purifying or chlorine contact tanks. The settled activated sludge is subsequently recycled, mixed with raw sewage and aerated in the aeration chamber. However, because only about 25 to 50 percent of the settled activated sludge is recycled to the aeration chamber, the remaining 75 to 50 percent of the settled sludge must be removed from the system. This factor makes it especially difficult to provide a unitary waste water treatment facility which is efficient, compact, easily serviceable and portable.

Other factors which affect the performance of sludge plants are sludge bulking and septicity of the treatment chambers. Sludge bulking occurs when the activated sludge does not settle well and as it becomes less dense the relative volume of a given mass increases. As the relative volume of the sludge increases, it becomes difficult for the sludge return pumps to keep up with the large volumes of light sludge settling in the tanks. Septicity is often evident on the floors of sedimentation and aeration units where sludge solids accumulate and, when encountered, the septic solids should be removed to prevent the plant from becoming inefficient. To help prevent the occurrence of sludge bulking and septicity, the sludge solids should be properly aerated and controlled. However, in plants which have a large amount of internal reinforcement, complicated piping and tanks which are not streamlined, deleterious effects, such as septicity and sludge bulking, are difficult to control. Accordingly, the present invention relates to treatment tanks having a streamlined design which incorporates little additional internal reinforcement and an uncomplicated pattern of piping.

A relatively recent modification of the activated sludge process is the extended aeration activated sludge process, hereinafter known as the extended aeration process. The extended aeration process, which particularly relates to the present invention when the loading is usually less than 25,000 gallons per day, is characterized by a relatively low loading range, as compared with the conventional activated sludge process, with an objective being to oxidize the biological material produced by synthesis from the removal of BOD. To achieve this objective, the mixed liquor is aerated for an extended period of time, such as for 24 hours, with sufficient oxygen and a deficient amount of organic material. Under this condition, the aerobic bacteria undergo endogenous respiration, wherein the bacteria become self-consuming. Under theoretical conditions, no excess activated sludge will be produced during a treatment cycle and the rate of activated sludge produced will equal the rate of activated sludge consumed. Practically, however, activated sludge is lost from the system as suspended solids in the effluent and as a result of periodic partial wasting of the activated sludge. Various insoluble products produced during the biological degradation process and suspended solids, such as sand and grit, tend to accumulate because the activated solids are recycled and it is necessary, for efficient plant operation, to periodically remove a portion of the sludge, which contains the accumulated insoluble particles and suspended solids. However, after a periodic wasting, the amount of activated sludge present in the system can be built up to desired levels by controlling the operating parameters of the system.

The present invention also relates to a waste water treatment plant which incorporates a blend of economical fabrication and structural integrity. More specifically, the treatment plant of the present invention includes a horizontal elongated first tank, which is divided by partitions into aerating, holding and purifying or chlorine contact chambers, and an upstanding second tank used as a clarifier and uniquely secured to an end wall portion of the first tank. The partitions in the first tank also provide additional longitudinal structural support for the second tank and reinforce the connection between the tanks. An additional feature of the present invention relates to a first tank which may be wider than the second tank at the connection region of the two tanks and, as a result, the first tank includes generally vertical end wall plates which provide reinforcing means for the tank connection in a direction transverse to the longitudinal axis of the first tank. Furthermore, when the longitudinal axes of the tanks are perpendicular and intersect each other a particularly stable structure is formed. Therefore, the combination of a transverse partition, an end wall and a longitudinal partition not only strengthens the first tank against shear, compression and tension forces, torsional stresses and bending moments but also reinforces the connection between the tanks without overdesigning the connection, which may allow the structure to fail in an undesirable mode such as a fracture.

In the preferred embodiment, the first and second tanks are cylindrical. By employing the structural integrity of the circle, the hydrostatic force of the water is transferred to a hoop stress in the circular steel tanks. It is envisioned that the structure of the present invention may be used as either a stationary plant or a portable plant. Stationary plants are usually designed for both stationary loads, such as the weight of the structure and various liquid levels to be contained therein, and dynamic loads, such as would result from equipment operation and flowing liquids. Portable plants should include not only design criteria associated with stationary plants, but also additional design criteria relating to stresses applied to the structure during shipment. Also, foundations for portable treatment plants often fail to provide the same measure of support provided for more permanent structures, thus requiring that portable structures be compact in design and sound in structural integrity.

There have been various attempts to develop portable water treatment plants which incorporate various features of structural integrity, economical fabrication and design, and mechanical reliability. For example, U.S. patents issued to J. Pagnotti (No. 3,152,982), F. Weis (No. 3,161,590), G. Kibbe (No. 3,195,727), M. Nottingham (No. 3,206,032), W. Wagner (No. 3,260,368), E. Simmons (No. 3,371,033), R. Fifer (No. 3,460,677), and A. Thompson (No. 3,767,051) relate to unitary treatment plants. Further, patents issued to A. Marmo (No. 3,684,703) and J. Yang (No. 3,694,353) relate to treatment plants which employ an extended aeration activated sludge treatment process.

SUMMARY OF THE INVENTION

This invention relates to a water treatment plant comprising a generally horizontal elongated first tank having a longitudinal axis and an upstanding second tank having a generally vertical axis, wherein the second tank includes a bottom portion having a circular bottom inner surface, an outlet and scraper means disposed in the bottom portion for moving sediment material from the bottom inner surface into the outlet. The longitudinal axis of the first tank is substantially perpendicular to the vertical axis of the second tank, and the first tank has a wall integrally attached to and intersecting a wall of the second tank along a substantial portion of the height of the second tank. Further, the bottom inner surface is conically inclined and converges downwardly toward the vertical axis with the scraper means having an axis of rotation substantially coincident with the vertical axis of the second tank, and a skimming means is disposed in the second tank for removing surface deposits from a liquid medium within the second tank.

The plant also includes a first pipe means for transporting sediment, which contains activated sludge, from the outlet to the first tank, aerating means in the first tank for introducing air into the activated sludge, and second pipe means for transporting the aerated activated sludge from the first tank to an upper portion of the second tank.

Another aspect of invention relates to the upstanding second tank having an intersecting portion which intersects the end wall of the first tank wherein the width of the intersecting portion is usually less than the width of the end wall of the first tank. A further aspect of the present invention relates to a structure having a first tank which includes a first partition located substantially perpendicular to the longitudinal axis of the first tank and located adjacent to a first end portion of the first tank for separating the first tank into an aeration chamber and a second section. A second partition is secured to the first and second tanks and the first partition and it extends from an intermediate portion of the first partition to a wall of the second tank. The second partition divides the second section into a sludge holding chamber and a purifying or chlorine contact chamber. The first and second partitions also comprise a means for reinforcing the connection between the first and second tanks and a means for internally reinforcing the first tank. The structure of the present invention is especially stable when the first and second tanks are cylindrical or have cylindrical wall portions.

Accordingly, an object of this invention is to provide a water treatment plant which incorporates a blend of structural integrity, economical fabrication and design, and mechanical reliability.

Another object is to provide a unitary water treatment plant.

A further object is the provision of internal reinforcing means which serves the functions of partitioning a first tank into operational chambers, reinforcing the first tank and also reinforcing the connection defined by the intersecting portions of first and second tanks.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may be best understood by reference to the following description taken in connection with the accompanying drawings in which:

DESCRIPTION OF THE PREFERRED EMBODIMENT

Figure 1:
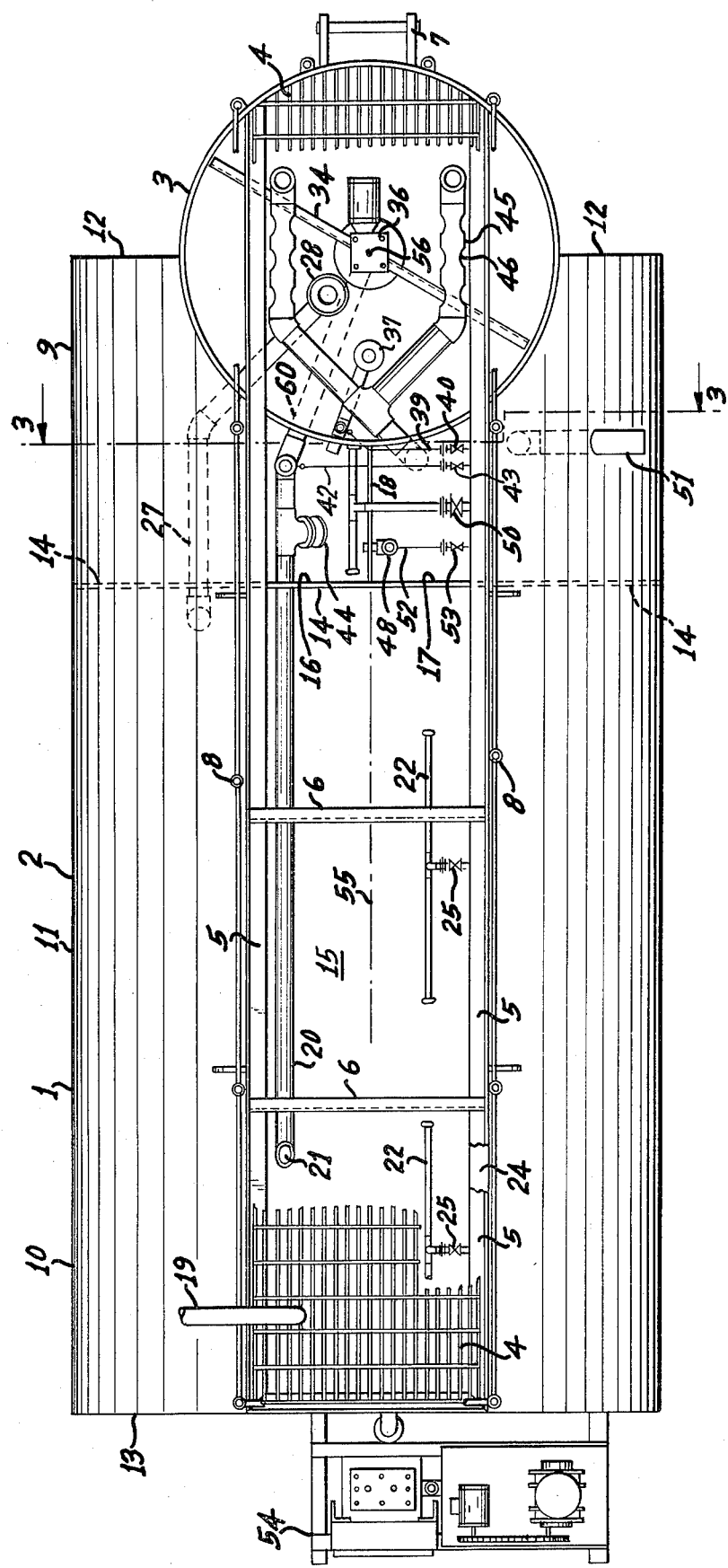
FIG. 1 is a top plan view of the treatment plant.

Referring to the drawings, which shows the preferred illustrated embodiment of the invention, FIG. 1 shows a top plan view of the treatment plant 1 having a generally horizontal elongated first tank 2 and an upstanding second tank 3. In the illustrated embodiment, the first and second tanks are preferably cylindrical and constructed with a minimum thickness of one-fourth inch MOH steel plate. The plate and structural members are connected by welding, such as shielded electric arc welding, with continuous welds where required to provide a watertight connection. The welded structural and plate components are designed to comply with fabrication and structural specifications. As shown in FIG. 1, the plant is equipped with a walkway 4 which extends the entire length of the upper portion of the plant. The walkway 4 is constructed of steel grating cut into sections not exceeding eight feet in length to allow easy removal, with cut-outs provided for access to various pipes and controls. The walkways are supported on a perimeter angle flange 5 which extends the entire perimeter of an opening in the upper portion of the treatment plant. Attached between the perimeter angle flanges 5 are support flanges 6. For access to the walkway, a steel ladder 7 is secured to one end of the treatment plant. A handrail 8, as shown in FIGS. 1 and 2, extends along the perimeter of the opening in the upper portion of the treatment plant.

Figure 4:
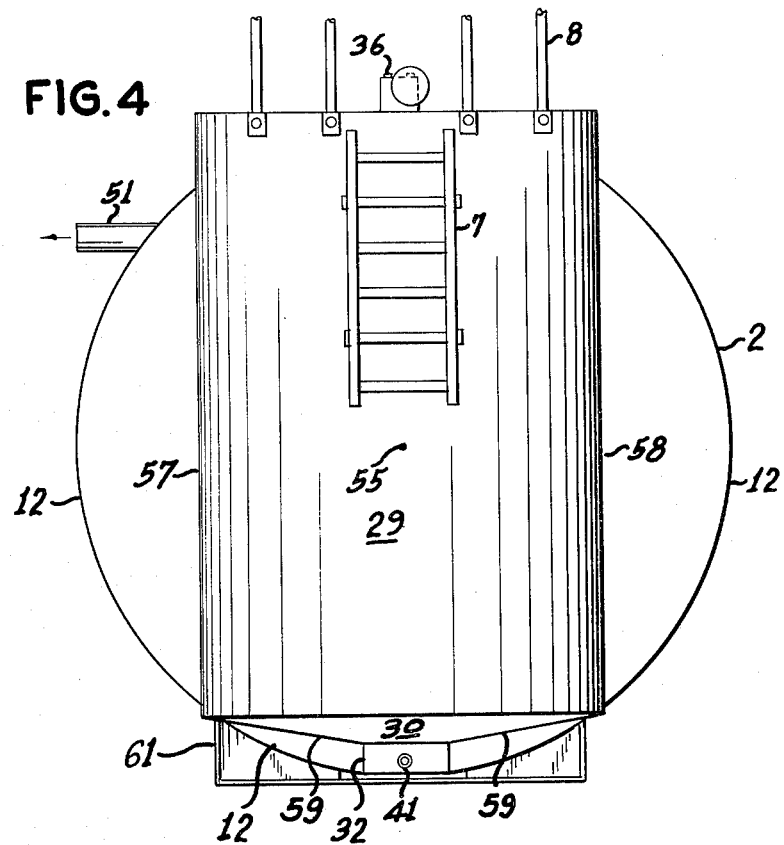
FIG. 4 is an end view of the treatment plant.

The first tank 2 is preferably cylindrical and includes a first end portion 9, a second end portion 10 and an intermediate portion 11, shown in FIG. 1. The end portion 9 includes a generally vertical end wall 12, as shown in FIGS. 1 and 4, and end portion 10 includes a generally vertical end wall 13. A first partition 14 divides the tank 2 into an aeration chamber 15, which extends from the partition 14 to the end wall 13, and a second section, which extends from the partition 14 to the end wall 12 and the tank 3. The second section is divided into a sludge holding chamber 16 and a purifying or chlorine contact chamber 17 by a second partition 18, which extends from an intermediate portion of the first partition 14 to the tank 3.

Figure 2:
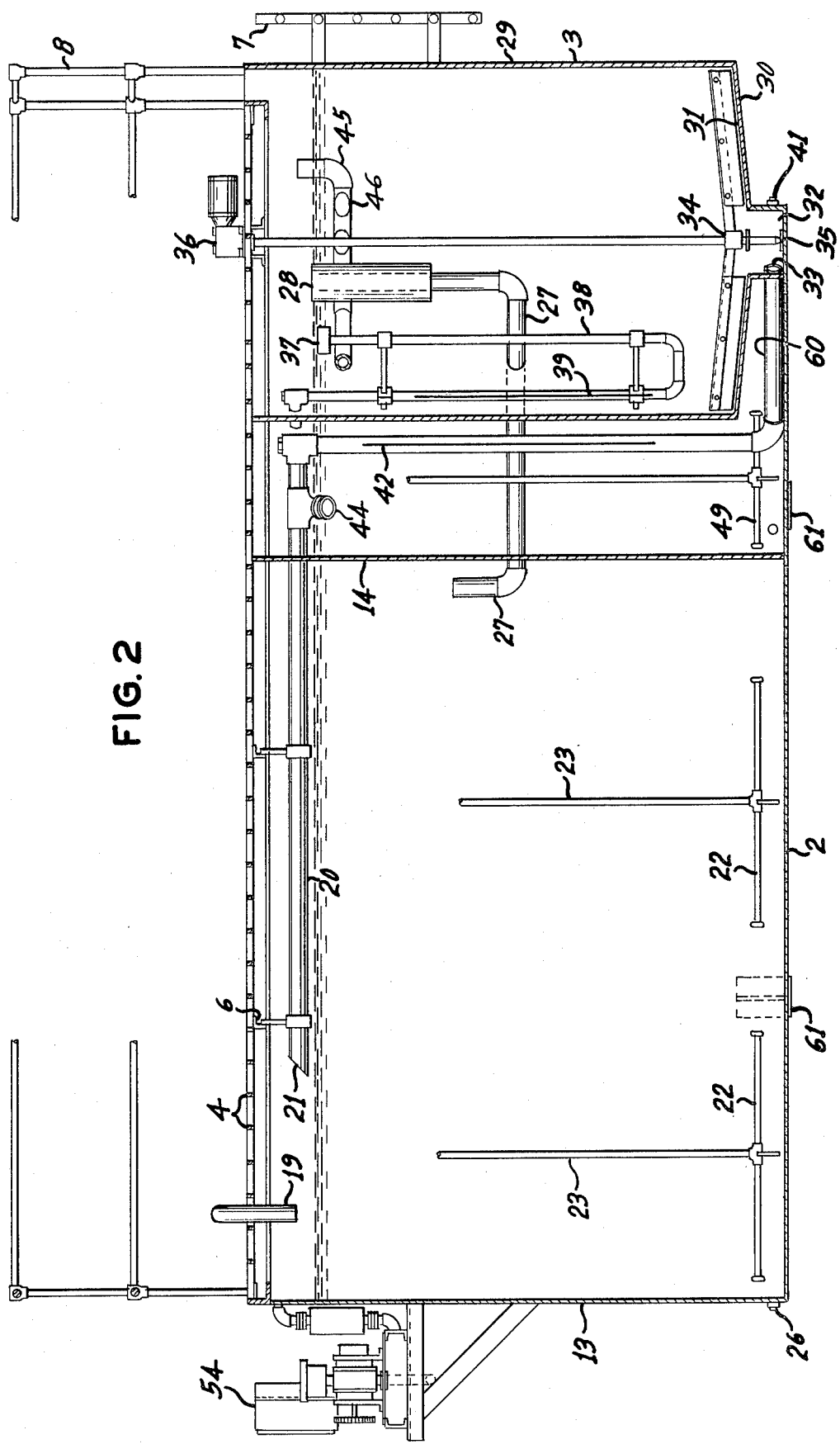
FIG. 2 is a side elevational view thereof.

The aeration chamber 15, as shown in FIGS. 1 and 2, serves as the aeration zone for the mixed liquor of raw sewage and activated sludge. The raw sewage enters the aeration chamber 15 through an inlet 19 disposed in the upper part of end portion 10 of tank 2. Preferably, the sewage inlet opening of the inlet 19 will be above the normal mixed liquor level in the aeration chamber and the inlet may be positioned to pass through a cut-out in walkway 4 or other areas of the upper part of end portion 10. The activated sludge enters the aeration chamber 15 through a first pipe means 20 which extends from a bottom portion of the second tank 3, which constitutes a clarifying chamber, to an opening 21 in the upper part of the end portion 10, adjacent the inlet 19, wherein the pipe means 20 is partially supported from support flanges 6. The degree of intial mixing is influenced not only by the relative positions of the inlet 19 and pipe opening 21 of first pipe means 20 but also by the extent of primary treatment of the raw sewage. The raw sewage-activated sludge mixture or mixed liquor is supplied with air, which contains oxygen, from aerating means comprising air diffusers 22. The air diffuser, illustrated in FIGS. 1 and 2, includes a vertical air pipe 23 which extends from a common manifold 24, shown in FIG. 3. The horizontal diffuser pipe sections also include air holes, which may be of varying dimensions, and end caps which close the ends of the horizontal diffuser pipe sections, and, as shown in FIG. 1, the air diffusers are offset from the longitudinal axis 55 of the tank 2.

The air from the offset diffuser pipes 22 tends to impart a circulating or revolving motion to the mixed liquor about the longitudinal axis of the aeration chamber 15 of the first tank 2. This circulating motion tends to cause a relatively complete mixing of the mixed liquor and the air, without the addition of mechanical mixing devices. The cylindrical configuration of the preferred aeration chamber permits a more streamlined flow pattern than chambers having a non-circular shape. It is also envisioned that a tapered, step or other modified aeration processes may be employed with the present apparatus. In aeration chambers having a longitudinal flow pattern, the portion adjacent the sewage inlet will experience a relatively high oxygen demand, which decreases as the flow approaches an outlet, and tapered aeration process takes the gradually decreasing oxygen demand of the mixed liquor into account by making more oxygen available at the sewage inlet end of the chamber. The step aeration process involves the introduction of sewage into the aeration chamber at spaced intervals along the longitudinal flow direction. The vertical pipes 23 are provided with a valve means or an aeration air valve 25 which connects the vertical pipe 23 with the manifold 24. The amount of air entering the diffuser pipes 22 is controlled by the air valves 25. The aeration chamber includes a drain 26 positioned in the bottom of end wall 13, as shown in FIG. 2. As the sewage particles enter the aeration chamber they travel in a longitudinal helical path toward the second pipe means 27 which extend from an opening located adjacent the first partition 14 to a stilling baffle 28, as shown in FIGS. 1 and 2, in the clarifying chamber or second tank 3.

The stilling baffle 28 comprises a circular pipe, open at both ends and approximately three to four feet in length, that surrounds the end of pipe means 27 in second tank 3. The stilling baffle 28 is designed to extend about two to three inches above the maximum water level in the clarifying chamber and about one foot above the aforementioned end of pipe means 27. If desired, the position of the stilling baffle may be changed, relative to the desired water level. The aerated mixed liquor exits from the stilling baffle structure at an opening defined by the lower end of the baffle 28 and the pipe means 27.

The second tank 3 or clarifying chamber separates the aerated mixed liquor into flotable impurities, relatively clear effluent and settable sediment, which includes activated sludge. The second tank or clarifier includes a cylindrical upper portion 29 and a bottom portion 30, which includes a circular bottom surface 31, a well 32 and an outlet 33, shown in FIGS. 2 and 4. The sediment which settles on the bottom surface is moved toward the outlet 33 by scraper means 34 which has an axis of rotation generally coincident with the vertical axis 56 of the clarifier chamber or second tank 3. The scraper means 34 is rotatably supported on a bearing pad 35 and is rotated by motor means 36, shown in FIG. 2. Supported from the arm portions of the scraper means are scraping elements, which may be brushes, flexible planar elements or similar elements. Skimming means 37, shown in FIGS. 1 and 2, are positioned in the upper portion of the clarifier chamber to remove floating impurities from the effluent. Attached to the skimming means is a skimming pipe means 38 which is U-shaped and extends to an inner wall of the upper portion 29 of the clarifier chamber, with a short pipe section extending through the clarifier chamber wall into the sludge holding chamber 16. Removal of floating impurities is controlled by air lift means 39 attached between manifold 24 and a lower portion of pipe means 38, as shown in FIG. 2. The amount air entering the air lift means is controlled by air valve 40, shown in FIG. 1.

Figure 3:
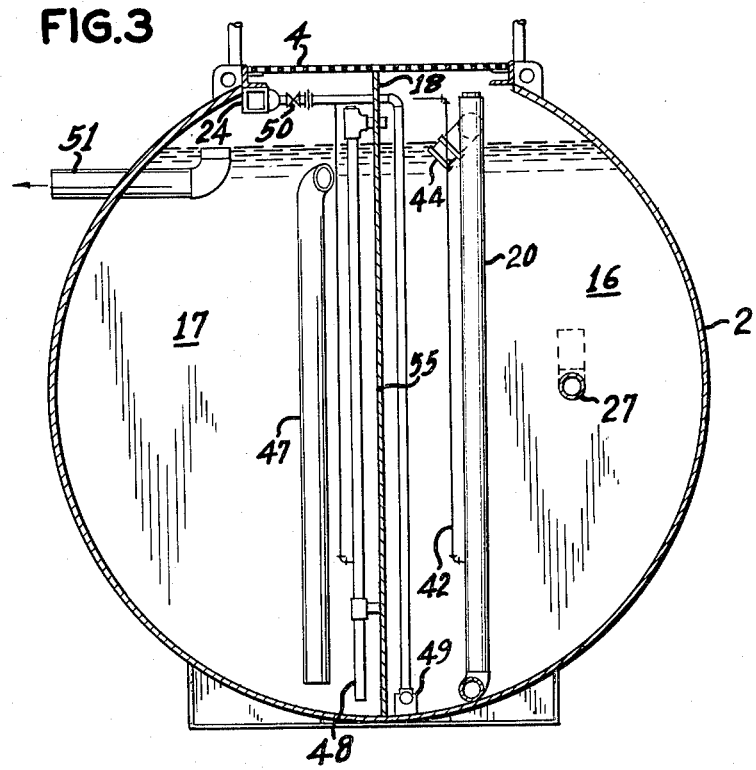
FIG. 3 is a sectional view along line 3—3 of the treatment plant.

In the preferred illustrated embodiment, a well 32 is provided in the lower region of the bottom portion 30, with an outlet 33 and well drain 41 provided in the well 32, as illustrated in FIG. 2. The outlet 33 opens into first pipe means 20 and the sediment is moved through pipe means 20 by air lift means 42 attached between a lower portion of pipe means 20 and manifold 24, wherein the air lift means 42 is controlled by air valve 43. The first pipe means 20 has a horizontal lower pipe, an intermediate vertical pipe and an upper horizontal pipe which exits from the upper portion of the sludge holding chamber into the aeration chamber 15. The first pipe means 20 also includes a sludge diversion valve 44 which allows a periodic removal of the sediment, which contains activated sludge, from the first pipe means 20 into the sludge holding chamber 16, as shown in FIGS. 2 and 3. Another function of the clarifying chamber is to transfer the relatively clear effluent to the chlorine contact chamber 17 for disinfecting the effluent. This is accomplished by means of a Y-shaped submerged weir 45 containing inlet ports 46 lying along its horizontal axis beneath the skimming range of the skimming means 37. The submerged weir passes through a wall of clarifying chamber and includes a vertical weir pipe 47 which deposits the clear effluent near the bottom of the chlorine contact chamber 17.

The sludge holding chamber is designed to hold surface debris removed by the skimming means 37, sediment removed from the first pipe means 20 through diversion valve 44 and settled solids in the contact chamber 17 removed through pipe means 48, which extends from the bottom of the chlorine contact chamber 17. The sludge holding chamber includes an air diffuser 49 similar in construction to air diffuser 22, wherein the air diffuser 49 includes an aeration air valve 50 which controls the supply of air from the manifold 24 to the diffuser 49.

The chlorine contact chamber 17, designed to purify the effluent, includes a discharge pipe 51 and contact pipe means 48, which is provided with air lift means 52 having an air valve 53. Preferably, the contact chamber 17 is a chlorination chamber. The final effluent discharges from the chlorination chamber by means of the level maintaining discharge pipe 51 designed to maintain a constant liquid level throughout the functioning chambers of the treatment plant.

In order for the plant to function properly, a supply of air is maintained to the diffusers 22 so that the sewage and activated sludge are completely mixed and oxygen from the air is dissolved into the mixed liquor for use by the activated sludge bacteria. Air from the same source is also employed to operate the air lifts 39, 42 and 52 and the diffuser 49, all of which are connected to the manifold 24. The manifold 24 is connected to a blower apparatus 54 mounted on the upper part of end wall 13. It is well known to supply the blower apparatus with various relief valves, check valves, pressure gauges, vacuum breakers and other pressure controls.

The treatment plant incorporates a unique blend of structural integrity and economical design. Briefly, the longitudinal axis of the first tank 2, represented by 55, is preferably perpendicular to the vertical axis of the second tank 3, represented by point dot 56 in FIG. 1. The second tank intersects and is integrally secured to the end wall 12 of the first tank, particularly illustrated in FIGS. 1 and 4, such that the second tank upper portion 29 and end wall 12 define a first vertical connection zone 57 and a second vertical connection zone 58. Additionally, the intersection of the bottom portion 30 with the end wall 12 defines a bottom portion connection zone 59. Therefore, the upstanding second tank is supported against vertical and lateral displacement, relative to the longitudinal axis of the first tank, by sections of the end wall 12 adjacent the connection zones 57, 58 and 59.

Reinforcing means comprising a first partition 14 and a second partition 18 reinforces not only the first end portion 9 of the first tank against various applied stresses, but also the connection defined by the intersection of the first and second tanks. The second partition 18 is integrally connected, such as by welding, to the first partition 14 and the first and second tanks and extends from an intermediate portion of the first partition 14 to the upper portion 29 and bottom portion 30 of the second tank. The partition 18 also includes an extension not shown which is connected between the bottom portion 30 and the bottom of cylindrical tank 2 in front of the pipe run 60, as shown in FIG. 2. The first partition 14 not only stiffens the first end portion 9, but also stiffens the second partition 18. Accordingly, the first and second partitions not only function as reinforcing members but also separate the first tank into aeration, sludge holding and contact chambers. Further, the combination of the end wall and partition support structure forms a cradle which uniquely connects the first tank 2 to the second tank 3. The stability of the present design is further enhanced if the first tank is cylindrical and the second tank has a cylindrical upper portion, wherein circular configuration enables the transference of the hydrostatic force of the water to a hoop stress in the tank walls, thus tending to cause a more uniform stress distribution in the resulting structure.

It is envisioned that the treatment plant will be portable and supported on saddle supports 61.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a water treatment plant, a generally horizontal elongated first cylindrical tank having a longitudinal axis, an elongated cylindrical upstanding second tank having a cylindrical wall and generally vertical axis, said second tank including a bottom portion having a circular bottom inner surface and an outlet and scraper means disposed in said bottom portion for moving sediment material from said bottom inner surface into said outlet, said longitudinal axis of said first tank being substantially perpendicular to said vertical axis of said second tank, and said first tank having a planar wall integrally attached to and laterally intersecting said wall of said second tank along a substantial portion of the length of said second tank.

2. The combination according to claim 1, wherein said second tank height is substantially equal to the diameter of said first tank.

3. The combination according to claim 1 wherein the horizontal dimension of said second tank is less than the horizontal dimension of said planar wall of said first tank.

4. The combination according to claim 1, wherein said first tank includes an aeration chamber and a holding chamber disposed between said aeration chamber and said second tank, first pipe means for transporting said sediment from said outlet and through said holding chamber into said aeration chamber, said first pipe means including means for removing said sediment from said pipe means and depositing said sediment in said holding chamber.

5. The combination according to claim 4, wherein said holding chamber is juxtaposed to said second tank.

6. In a water treatment plant, a generally horizontal cylindrical elongated first tank having first and second end portions and a longitudinal axis, said first end portion having a planar end wall through which said longitudinal axis extends, an upstanding cylindrical second tank having a bottom portion and an upper portion thereabove, said second tank intersecting and integrally attached to said end wall so that part of said second tank is disposed outwardly of said planar end wall, said longitudinal axis of said first tank being substantially perpendicular to the vertical axis of said second tank, and the width of the intersecting portion of said second tank being less than the width of said planar end wall.

7. The combination according to claim 6, wherein said vertical axis of said second tank intersects said longitudinal axis of said first tank.

8. The combination according to claim 7, wherein said bottom and upper portions of said second tank intersect said end wall, said bottom portion having a circular bottom inner surface and an outlet, said bottom inner surface having a lower part, said outlet disposed in said lower portion and said bottom inner surface being declined toward said outlet, scraper means in said bottom portion for moving sediment material from said bottom inner surface into said lower part, a holding chamber juxtaposed to said second tank and within said first tank, pipe means for passing the sediment material from said lower part into said holding chamber.

9. The combination according to claim 6 further comprising a first partition substantially perpendicular to said longitudinal axis and adjacent said first end portion for separating said first tank into an aeration chamber, which extends from said first partition to said second end portion, and a second chamber, which extends from said first partition to said end wall and said second tank, and reinforcing wall means for connecting an intermediate portion of said first partition to said second tank.

10. The combination according to claim 9, wherein said reinforcing means comprises a second partition substantially parallel with said longitudinal axis and separating said second chamber into a sludge holding chamber and a contact chamber, pipe means connected between said second tank and said sludge holding chamber to transport sludge therebetween and weir means for transporting clarified effluent from said second tank into said contact chamber.

11. In a water treatment plant, a generally horizontally disposed cylindrical first tank having first and second end wall portions and a longitudinal axis, said first end wall portion having an end wall extending generally transversely of said longitudinal axis, an upstanding second tank having a bottom portion and an elongated cylindrical upper portion disposed above said bottom portion, first means for integrally attaching said upper portion of said second tank to said end wall along spaced vertical elongated zones of connection, second means for integrally attaching said upper portion of said second tank to said cylindrical end wall portion of said first tank, and means for connecting said bottom portion of said second tank to said end wall portion of said first tank, said second means including a first partition substantially perpendicular to said longitudinal axis and adjacent and integral to said first end portion for separating said first tank into an aeration chamber which extends from one side of said partition to said second end wall portion and a second chamber which extends from an opposite side of said partition to said end wall and said second tank.

12. The combination according to claim 11, wherein said second means comprises a second partition integrally connecting an intermediate part of said first partition to said second tank and separating said second chamber into a sludge holding chamber and an effluent purifying chamber.

* * * * *